United States Patent Office 3,257,204
Patented June 21, 1966

3,257,204
ELECTROPHOTOGRAPHIC REPRODUCTION
MATERIAL
Oskar Süs, Martha Tomanek, and Erwin Lind, Wiesbaden-Biebrich, Germany, assignors, by mesne assignments, to Azoplate Corporation, Murray Hill, N.J.
No Drawing. Filed Aug. 19, 1959, Ser. No. 834,680
Claims priority, application Germany, Aug. 22, 1958, K 35,586
46 Claims. (Cl. 96—1.5)

Among modern reproduction processes, the electrophotographic process, also known as xerography, is becoming of increasing practical importance. It is a dry process of particular interest in certain fields, for example in office duplicating, and generally consists in the application to a material consisting of an electrically conductive support and a photoconductive insulating layer adherent thereto of an electrostatic charge which imparts to the insulating layer the property of light-sensitivity. Such light-sensitive material can be used for the production of images by electrophotographic means. It is exposed to light beneath a master, so that the electrostatic charge is leaked away in the parts of the layer struck by light. The invisible electrostatic image thereby produced is made visible (developed) by powdering over with finely divided, colored synthetic resin and given permanence (fixed) by the application of heat to the support.

Known materials used for the preparation of the photoconductive insulating layers required for the aforedescribed process include selenium, sulphur, zinc oxide, and also organic substances such as anthracene or anthraquinone. Consideration has also been given to a method of preparing the photoconductive insulating layers whereby the photoconductive substances, in association with binding agents, are dispersed in solvents, applied thus to electrically conductive supports, primarily metal foils, and dried. However, the photoelectrically sensitizable material thus obtained has not yet satisfied the extensive demands expected of modern duplicating material in respect to range of use, reliability, simplicity in handling, and not least in importance, light-sensitivity and keeping qualities.

It has now been found that photoelectrically sensitizable layers can be produced successfully and with an unexpected usefulness by using as photoconductive substances compounds corresponding to the general formula

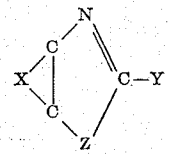

In the general formula stated above,

X is an aromatic ring fused with the 5-membered ring,
Y is a monovalent aromatic or heterocyclic radical, and
Z is oxygen, sulphur or the imino group, wherein the hydrogen atom may be substituted by an alkyl, aryl or aralkyl radical.

In the case of substitution, the oxazoles, thiazoles, or imidazoles according to the present invention contain as substituents halogens, hydroxy groups, alkoxy groups, alkyl groups, dihydroxymethylene groups, nitro groups, amino groups, acetylamino groups and preferably dialkylamino groups. The compounds to be used according to the present invention are photoconductive and are especially suitable for the production of homogeneous layers, which are very stable. The compounds are mostly colorless, some are yellow colored, especially the compounds corresponding to Formulae 23 to 33 and 54 to 56 below.

Many of the polynuclear oxazole, thiazole or imidazole compounds to be used according to the present invention are known and the production thereof is described in the literature. As far as this is not the case, in order to obtain photoconductive compounds according to the present invention, known methods of production are similarly used. Benzothiazoles are obtained by condensing equimolecular quantities of ortho-aminothiophenols or ortho-aminothiosulfonic acids with aldehydes and then dehydrogenating the condensation products with boiling alcohol or acetic acid. Benzoxazoles are prepared from Schiff bases, obtained by condensing orthoaminophenols with aldehydes, by dehydrogenating the bases with lead tetraacetate as a dehydrogenating agent in acetic acid or benzene solution. When boiling ortho-phenylendiamines with aldehydes in an alcoholic solution and in the presence of nitrobenzene or dinitrobenzene as a dehydrogenating agent, benzimidazoles are formed. The introduction of a sulfonamide group into the polynuclear thiazole, oxazole, and imidazole compounds is effected according to the method described in U.S. Patent No. 2,733,242.

The following formulae are exemplary of the compounds which may be employed in the present invention:

FORMULA 1

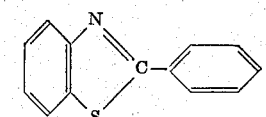

FORMULA 2

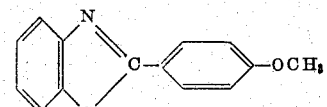

FORMULA 3

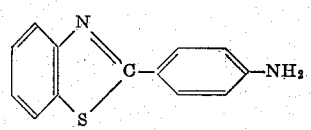

FORMULA 4

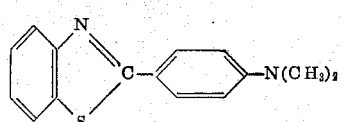

FORMULA 5

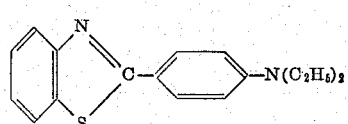

FORMULA 6

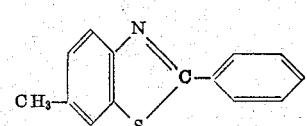

FORMULA 7

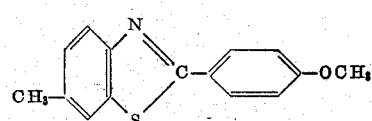

FORMULA 8
2-(4-aminophenyl)-6-methylbenzothiazole

FORMULA 9
2-(4-acetamidophenyl)-6-methylbenzothiazole

FORMULA 10
2-(4-dimethylaminophenyl)-6-methylbenzothiazole

FORMULA 11
2-(4-diethylaminophenyl)-6-methylbenzothiazole

FORMULA 12
2-(4-diethylaminophenyl)-6-methylbenzothiazole with SO$_2$N(CH$_3$)$_2$ substituent

FORMULA 13
2-(4-diethylaminophenyl)-6-methylbenzothiazole with SO$_2$N(C$_2$H$_5$)$_2$ substituent

FORMULA 14
2-(4-hydroxy-3-methoxyphenyl)-6-methylbenzothiazole

FORMULA 15
2-(3-hydroxy-4-methoxyphenyl)-6-methylbenzothiazole

FORMULA 16
2-(2-hydroxy-3-methoxyphenyl)-6-methylbenzothiazole

FORMULA 17
2-(3,4-dihydroxyphenyl)-6-methylbenzothiazole

FORMULA 18
2-phenyl-6-methoxybenzothiazole

FORMULA 19
2-(4-methoxyphenyl)-6-methoxybenzothiazole

FORMULA 20
2-(4-dimethylaminophenyl)-6-methoxybenzothiazole

FORMULA 21
2-(4-diethylaminophenyl)-6-methoxybenzothiazole

FORMULA 22
2-phenyl-6-dimethylaminobenzothiazole

FORMULA 23
2-(4-methoxyphenyl)-6-dimethylaminobenzothiazole

FORMULA 24
2-(4-nitrophenyl)-6-dimethylaminobenzothiazole

FORMULA 25
2-(3-nitrophenyl)-6-dimethylaminobenzothiazole

FORMULA 26
2-(2-nitrophenyl)-6-dimethylaminobenzothiazole

FORMULA 27
2-(4-dimethylaminophenyl)-6-dimethylaminobenzothiazole

FORMULA 28
2-(4-diethylaminophenyl)-6-dimethylaminobenzothiazole

FORMULA 29
2-(3,4-methylenedioxyphenyl)-6-dimethylaminobenzothiazole

FORMULA 30
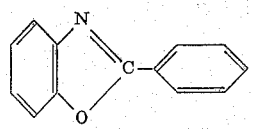
FORMULA 31
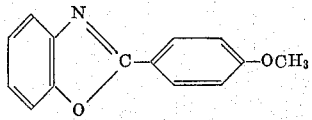
FORMULA 32
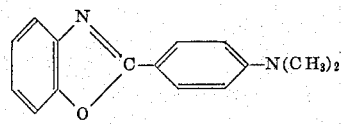
FORMULA 33
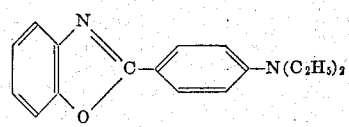
FORMULA 34
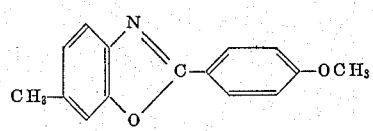
FORMULA 35
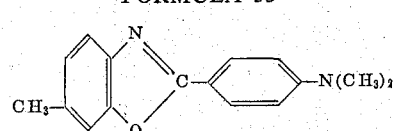
FORMULA 36
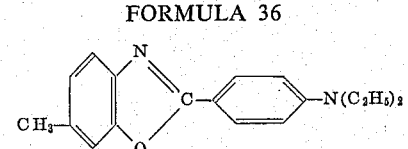
FORMULA 37
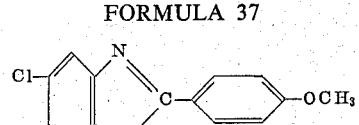
FORMULA 38
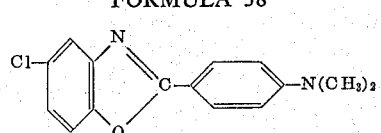
FORMULA 39
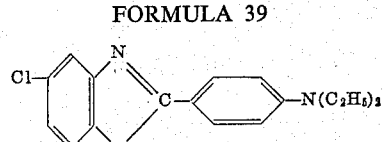
FORMULA 40
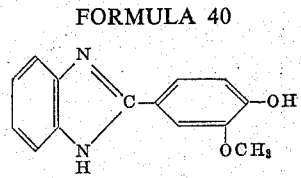
FORMULA 41
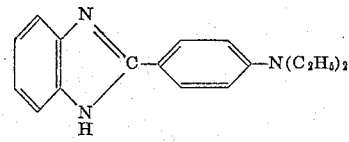
FORMULA 42
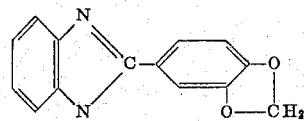
FORMULA 43
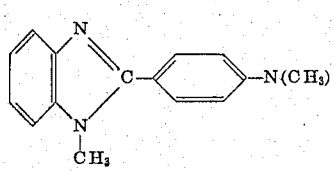
FORMULA 44
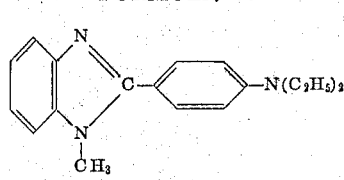
FORMULA 45
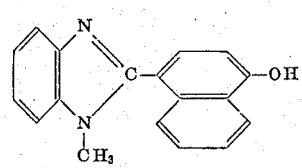
FORMULA 46
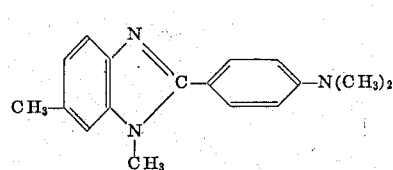
FORMULA 47
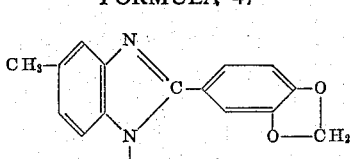
FORMULA 48
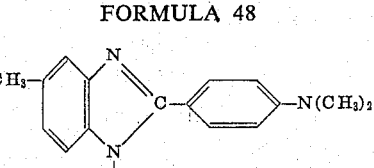
FORMULA 49
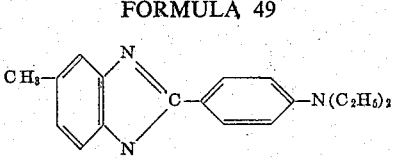

FORMULA 50
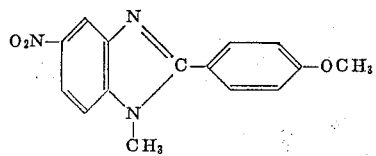
FORMULA 51
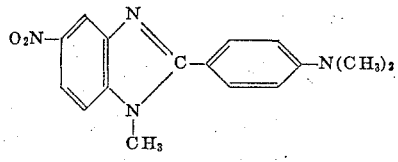
FORMULA 52
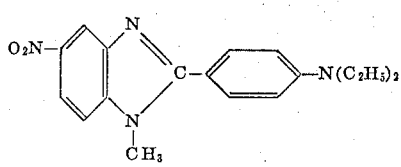
FORMULA 53
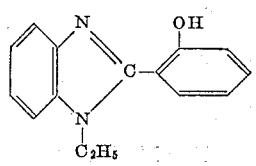
FORMULA 54
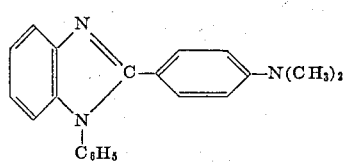
FORMULA 55
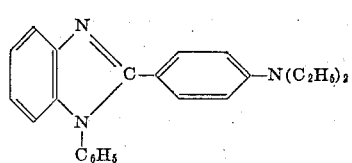
FORMULA 56
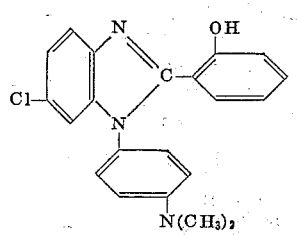
FORMULA 57
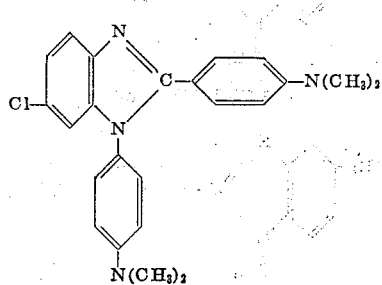
FORMULA 58
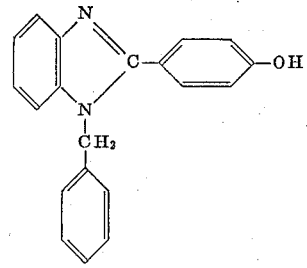
FORMULA 59
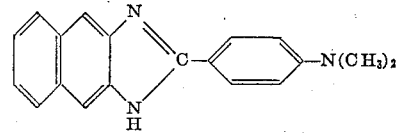
FORMULA 60
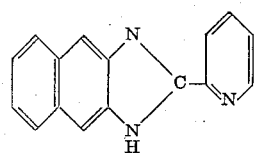
FORMULA 61
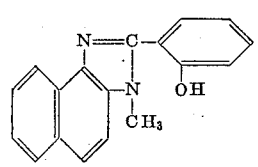
FORMULA 62
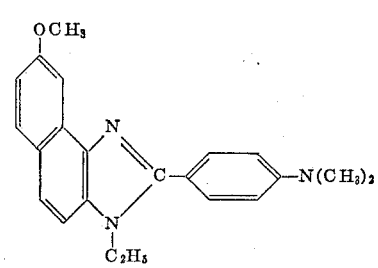
FORMULA 63
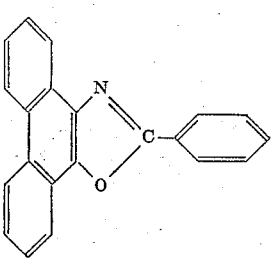
FORMULA 64
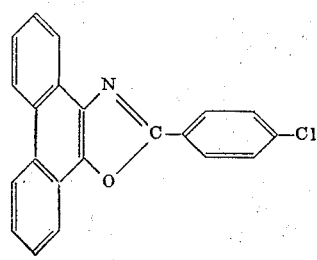

FORMULA 65

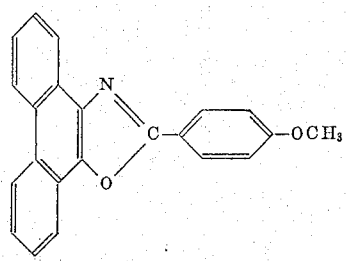

FORMULA 66

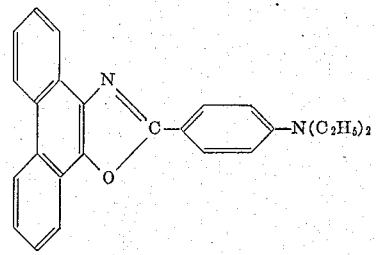

FORMULA 67

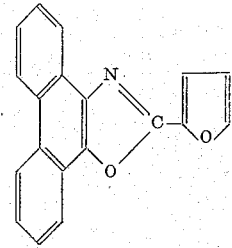

FORMULA 68

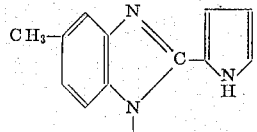

FORMULA 69

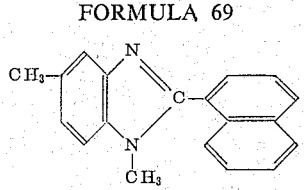

FORMULA 70

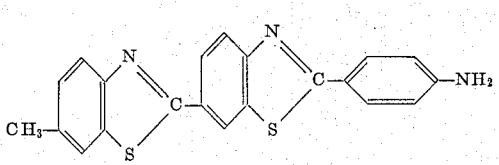

FORMULA 71

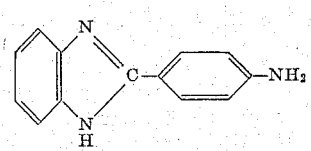

FORMULA 72

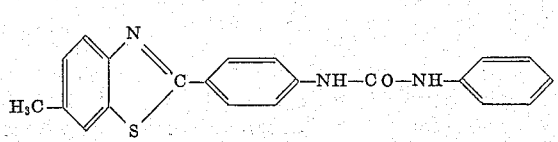

FORMULA 73

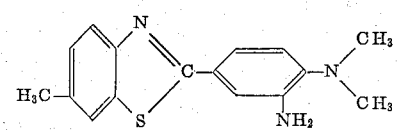

FORMULA 74

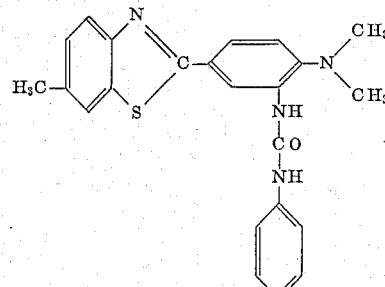

FORMULA 75

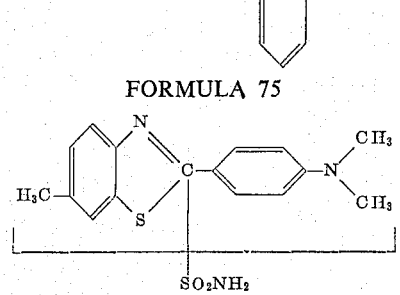

FORMULA 76

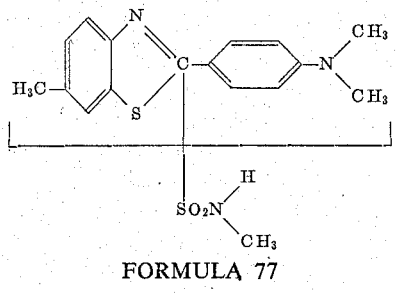

FORMULA 77

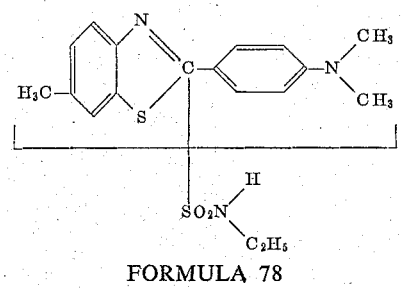

FORMULA 78

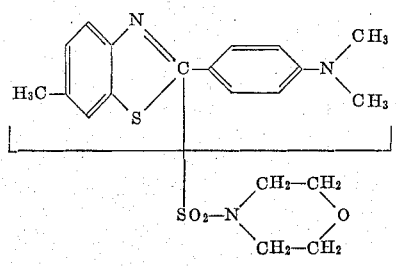

The following compounds correspond to the formulae, stated above:

2-phenyl-benzothiazole corresponding to Formula 1, melting point 114° C.

2-(4'-methoxy-phenyl)-benzothiazole corresponding to Formula 2, melting point 134° C.

2-(4'-amino-phenyl)-benzothiazole corresponding to Formula 3, melting point 157° C.

2-(4' - dimethylamino - phenyl)-benzothiazole corresponding to Formula 4, melting point 173° C., is obtained by boiling for several hours 5.7 g. of ortho-aminothiophenol (to be obtained in alcoholic solution from the zinc salt with the calculated quantity of hydrochloric acid) together with 6.0 g. of dimethylaminobenzaldehyde in alcohol under dehydrogenation and ring closure. After the reaction mixture has cooled, the benzothiazole precipitates in the form of weakly yellow crystals and is recrystallized from alcohol.

2-(4'-diethylamino-phenyl)-benzothiazole, corresponding to Formula 5, melting point 125° C. in the form of yellow crystals is obtained by boiling for several hours 5.7 g. of ortho-amino-thiophenol together with 7.0 g. of dimethylaminobenzaldehyde in alcohol. The crystals are purified by recrystallization from alcohol.

2-phenyl-6-methyl-benzothiazole corresponding to Formula 6, melting point 125° C.

2-(4'-methoxy - phenyl)-6-methyl-benzothiazole corresponding to Formula 7, melting point 174° C. is prepared by boiling for several hours 13.9 g. of 2-amino-5-methylthiophenol together with 13.6 g. of anisaldehyde in an alcoholic solution and then purifying it by recrystallization from alcohol.

2-(4'-aminophenyl) - 6-methyl - benzothiazole corresponding to Formula 8, melting point 191° C.

2-(4'-acetylamino - phenyl)-6-methyl - benzothiazole corresponding to Formula 9, melting point 225° C.

2-(4'-dimethylamino - phenyl)-6-methyl - benzothiazole corresponding to Formula 10, melting point 196 to 197° C.

2-(4'-diethylamino - phenyl)-6-methyl - benzothiazole, corresponding to Formula 11, melting point 128° C. The compound is obtained by boiling for several hours 5.6 g. of 2-amino-5-methylthiophenol with 7.1 g. of diethylaminobenzaldehyde in an alcoholic solution and purification by recrystallization from alcohol.

2-(4'-diethylamino - phenyl)-6-methyl - benzothiazole-N-dimethylsulfonamide, corresponding to Formula 12, melting point 145° C. The compound is prepared from 2-(4'-diethylamino - phenyl)-6-methyl - benzothiazole and chlorosulfonic acid. The sulfochloride thus obtained is reacted in known manner with dimethylamine and the sulfonamide which forms is recrystallized from alcohol for purification.

The 2-(4'-diethylamino - phenyl)-6-methyl - benzothiazole-N-diethylsulfonamide, corresponding to Formula 13, melting point 145° C., is prepared analogously to the preparation of the compound corresponding to Formula 12, using diethylamine instead of dimethylamine.

2-(3'-methoxy-4'-hydroxy - phenyl)-6-methyl - benzothiazole, corresponding to Formula 14, melting point 213° C. is obtained by boiling 5.6 g. of 2-amino-5-methylthiophenol with 6.1 g. of vanillin in an alcoholic solution. The compound is recrystallized from glacial acetic acid.

2-(3'-hydroxy - 4'-methoxy - phenyl)-6-methyl-benzothiazole, corresponding to Formula 15, melting point 138° C., is prepared by boiling 5.6 g. of 2-amino-5-methyl-thiophenol and 6.1 g. of isovanillin for 3 hours in an alcoholic solution. Purification is effected by recrystallizing from aqueous methanol.

2-(2'-methoxy - 6'-hydroxy - phenyl)-6-methyl-benzothiazole, corresponding to Formula 16, melting point 164° C., is prepared analogously, using 6.1 g. of ortho-vanillin and recrystallizing from alcohol.

2-(3',4'-dihydroxy - phenyl)-6-methyl - benzothiazole, corresponding to Formula 17, melting point 271° C., is prepared by boiling 5.6 g. of 2-amino-5-methyl-thiophenol with 5.5 g. of proto-catechualdehyde in an alcoholic solution and recrystallizing from aqueous methanol.

2-phenyl-6-methoxy-benzothiazole, corresponding to Formula 18, melting point 117° C.

2-(4'-methoxy - phenyl)-6-methoxy-benzothiazole, corresponding to Formula 19, melting point 163° C. is prepared by boiling 3.1 g. of 3-mercapto-4-amino-anisole with 2.7 g. of anisaldehyde in an alcoholic solution and recrystallizing from alcohol.

2-(4'-dimethylamino - phenyl)-6-methoxy-benzothiazole, corresponding to Formula 20, melting point 182° C.

2-(4'-diethylamino - phenyl)-6-methoxy-benzothiazole, corresponding to Formula 21, melting point 140° C., is prepared by boiling 3.1 g. of 3-mercapto-4-amino-anisole and 3.6 g. of 4-diethamino-benzaldehyde in an alcoholic solution and recrystallizing from alcohol.

2-phenyl-6-dimethylamino-benzothiazole, corresponding to Formula 22, melting point 135° C.

2-(4'-methoxy - phenyl)-6-dimethylamino - benzothiazole, corresponding to Formula 23, melting point 151° C., is obtained by boiling 12.4 g. of 4-dimethylamino-aniline-thiosulfonic acid (2) with 6.5 g. of anisaldehyde in 300 ml. of glacial acetic acid, pouring the glacial acetic acid solution into 2 liters of water and adding sodium acetate. The precipitating benzothiazole is recrystallized from alcohol.

2-(4'-nitro - phenyl)-6-dimethylamino - benzothiazole, corresponding to Formula 24, melting point 246° C.

2-(3'-nitro - phenyl)-6-dimethylamino - benzothiazole, corresponding to Formula 25, melting point 176° C.

2-(2'-nitro - phenyl)-6-dimethylamino - benzothiazole, corresponding to Formula 26, melting point 147° C.

2-(4' - dimethylamino - phenyl) - 6 - dimethylamino-benzothiazole, corresponding to Formula 27, melting point 230° C.

2 - (4' - diethylamino - phenyl) - 6 - dimethylamino-benzothiazole, corresponding to Formula 28, melting point 171° C., is prepared by boiling 10 g. of 4-dimethylamino-aniline-thiosulfonic acid (2) and 7 g. of 4-diethylamino-benzaldehyde in 200 ml. of glacial acetic acid and further processing analogously to the preparation of the compound corresponding to Formula 23.

2 - (3',4' - dihydroxymethylene - phenyl) - 6 - dimethyl-amino-benzothiazole, corresponding to Formula 29, melting point 176° C., is prepared by boiling 8.0 g. of the zinc salt of 2-amino-5-dimethylamino-thiophenol and 6.0 g. of piperonal in 30 ml. of glacial acetic acid. The benzothiazole is precipitated by adding alcohol and is then recrystallized from alcohol for purification.

2-phenyl-benzoxazole, corresponding to Formula 30, melting point 102° C.

2-(4'-methoxy-phenyl) - benzoxazole, corresponding to Formula 31, melting point 99° C.

2-(4'-dimethoxy-phenyl)-benzoxazole, corresponding to Formula 32, melting point 182° C.

2-(4'-dimethylamino-phenyl)-benzoxazole, corresponding to Formula 33, melting point 132° C., is prepared by dehydrogenating with lead tetraacetate in a benzolic solution the Schiff base which, in turn, is prepared by condensation of 11 g. of o-aminophenol with 18 g. of 4-diethyl-amino-benzaldehyde in an alcoholic solution. The benzoxazole obtained is recrystallized from alcohol.

2-(4'-methoxy-phenyl)-6 - methyl - benzoxazole, corresponding to Formula 34, melting point 91° C., is prepared by dehydrogenating the Schiff base obtained from 12.3 g. of 6-amino-3-cresol and 13.6 g. of anisaldehyde with lead tetraacetate in a benzolic solution. The benzoxazole obtained is recrystallized from alcohol.

2-(4'-dimethylamino-phenyl)-6 - methyl - benzoxazole, corresponding to Formula 35, melting point 189° C., is prepared analogously to the preparation of the compound corresponding to Formula 34, from the Schiff base obtained by condensation of 12.3 g. of 6-amino-3-cresol with 14.9 g. of 4-dimethylamino-benzaldehyde.

2-(4'-diethylamino-phenyl)-6-methyl-benzoxazole, corresponding to Formula 36, melting point 108° C., is also prepared analogously to the preparation of the compounds corresponding to Formulae 34 and 35 from the Schiff base which forms when 12.3 g. of 6-amino-3-cresol and 17.7 g. of 4-diethylamino-benzaldehyde are heated in an alcoholic solution.

2-(4'-methoxy-phenyl) - 5 - chloro - benzoxazole, corresponding to Formula 37, melting point 148° C., is prepared analogously to the preparation of the compounds corresponding to Formulae 34 through 36 from the Schiff base obtained from 14.3 g. of 4-chloro-2-amino-phenol and 13.6 g. of anisaldehyde by dehydrogenation with lead-tetraacetate in a benzolic solution.

The compound corresponding to Formula 38, 2-(4'-dimethylamino-phenyl)-5-chloro-benzoxazole, melting point 179° C., is prepared analogously from the Schiff base obtainable by condensation of 14.3 g. of 4-chloro-2-amino-phenyl and 14.9 g. of 4-dimethylaminobenzaldehyde.

The compound corresponding to Formula 39, 2-(4'-diethylamino - phenyl) - 5 - chloro - benzoxazole, melting point 160° C. is prepared analogously from the Schiff base prepared from 14.3 g. of 4-chloro-2-amino-phenol and 17.7 g. of 4-diethylaminobenzaldehyde. The chlorobenzoxazole, corresponding to Formula 39, is recrystallized from a mixture of benzene and a light petroleum fraction.

2-(3'-methoxy-4'-hydroxy-phenyl)-benzimidazole, corresponding to Formula 40, melting point 222° C.

2-(4'-diethylamino-phenyl)-benzimidazole, corresponding to Formula 41, melting point 233° C.

1-methyl-2-(3',4'-dihydroxymethylene-phenyl) - benzimidazole, corresponding to Formula 42, melting point 160° C., is prepared by boiling in an alcoholic solution 12.2 g. of N-methyl-o-phenylenediamine and 15.2 g. of piperonal, in the presence of 4.2 g. of m-dinitrobenzene acting as a dehydrogenating agent. The benzimidazole formed is recrystallized from alcohol.

1-methyl-2-(4'-dimethylamino-phenyl) - benzimidazole, corresponding to Formula 43, melting point 161° C., is prepared by boiling 12.2 g. of N-methyl-o-phenylenediamine with 14.9 g. of 4-dimethylaminobenzaldehyde in an alcoholic solution in the presence of 4.2 g. of m-dinitrobenzene acting as a dehydrogenating agent. For purification, the compound is recrystallized from a mixture of benzene and a light petroleum fraction.

1-methyl-2-(4'-diethylamino - phenyl) - benzimidazole, corresponding to Formula 44, melting point 124° C., is prepared analogously to the preparation of the compound corresponding to Formula 43. Instead of the quantity of 4-dimethylaminobenzaldehyde stated in connection with this compound above, 17.7 g. of 4-diethylamino-benzaldehyde are used. The benzimidazole thus formed is recrystallized from gasoline.

1-methyl-2-(4'-hydroxy-naphthyl (1))-benzimidazole, corresponding to Formula 45, melting point 311° C., is prepared by boiling 13.8 g. of 4-hydroxy-napthaldehyde (1) and 19.5 g. of N-methyl-o-phenylenediamine in an alcoholic solution and recrystallizing from alcohol the compound thus formed.

1-methyl-2-(4' - dimethylamino - phenyl) - 6 - methyl-benzimidazole, corresponding to Formula 46, melting point 180° C., is prepared by boiling an alcoholic solution of 5.4 g. of 2-amino-5-methyl-1-monomethylaniline and 6.0 g. of 4-dimethylamino-benzaldehyde in the presence of 1.67 g. of m-dinitrobenzene as a dehydrogenating agent. After heating for 2 hours under a reflux condenser, the alcohol is distilled off and the residue is diluted with ether and separated. The benzimidazole thus formed is dissolved in hydrochloric acid, the solution is treated with animal charcoal, filtered, and the filtrate is then, dropwise, added to a sodium carbonate solution. The precipitated reaction product is separated, dried, and recrystallized from a mixture of benzene and a light petroleum fraction.

1 - methyl - 2 - (3',4'-dihydroxy-methylene-phenyl)-5-methyl-benzimidazole, corresponding to Formula 47, melting point 149° C., is prepared by boiling 6.8 g. of 2 - amino - 4 - methyl-1-monomethylaniline and 7.5 g. of piperonal with 2.1 g. of m-dinitrobenzene in 100 ml. of alcohol. After two hours the alcohol is distilled off and the residue is rubbed with ether and separated. For purification, the reaction product is recrystallized from 50 percent alcohol.

1 - methyl - 2 - (4'-dimethylamino-phenyl)-5-methyl-benzimidazole, corresponding to Formula 48, melting point 161° C., is prepared by boiling 6.8 g. of 2-amino-4-methyl-1-monomethyl aniline and 7.5 g. of 4-dimethylaminobenzaldehyde in an alcoholic solution, in the presence of 2.1 g. of m-dinitrobenzene as a dehydrogenating agent. After two hours the alcohol is distilled off and the residue is rubbed with ether, separated and recrystallized from 50 percent alcohol.

1 - methyl - 2 - (4'-diethylamino-phenyl)-5-methyl-benzimidazole corresponding to Formula 49, melting point 149° C., is prepared analogously to the preparation of the compound corresponding to Formula 48, using, instead of the 4-dimethylaminobenzaldehyde an equivalent quantity of 4-diethylaminobenzaldehyde.

1 - methyl-2-(4'-methoxyphenyl)-5-nitro-benzimidazole, corresponding to Formula 50, melting point 171° C., is obtained by boiling 4.2 g. of 2-amino-4-nitro-1-monomethylaniline and 3.4 g. of anisaldehyde in an alcoholic solution, using 1.1 g. of m-dinitrobenzene as a dehydrogenating agent. The alcohol is distilled off and the residue is rubbed with ether, separated and recrystallized from alcohol.

If, instead of the 3.4 g. of anisaldehyde, 3.8 g. of 4-dimethylaminobenzaldehyde are used, 1-methyl-2-(4'-dimethylamino - phenyl) 5 - nitro - benzimidazole, corresponding to Formula 51, melting point 238° C., is obtained by an analogous process.

Upon replacing the above 3.4 g. of anisaldehyde by 4.5 g. of 4-diethylaminobenzaldehyde, the 1-methyl-2-(4' - diethylamino - phenyl)-5-nitro-benzimidazole, corresponding to Formula 52, melting point 154° C., is obtained.

1 - ethyl - 2-(2'-hydroxy-phenyl)-benzimidazole corresponding to Formula 53, melting point 129° C., is prepared by boiling an alcoholic solution containing 13.6 g. of N-ethyl-o-phenylenediamine and 12.2 g. of salicylic aldehyde for 8 hours and adding 4.2 g. of m-dinitrobenzene. For purification, the compound obtained is recrystallized from alcohol.

1 - phenyl - 2 - (4'-dimethylamino-phenyl)-benzimidazole, corresponding to Formula 54, melting point 222° C., is obtained by 20 hours' boiling of an alcoholic solution containing 6.4 g. of 2-amino-diphenylamine and 5.25 g. of N,N-dimethylaminobenzaldehyde and 3 g. of m-dinitrobenzene as a dehydrogenating agent. For purification, the reaction product is recrystallized from alcohol.

1 - phenyl - 2-(4'-diethylamino-phenyl)-benzimidazole, corresponding to Formula 55, melting point 148° C., is prepared analogously, using, instead of the 5.25 g. of 4-dimethylaminobenzaldehyde, 6.2 g. of 4-diethylaminobenzaldehyde. The compound is recrystallized from aqueous methanol.

1 - (4'-dimethylamino-phenyl)-2-(2'-hydroxy-phenyl)-6-chloro-benzimidazole, corresponding to Formula 56, melting point 218° C., is obtained by 25 hours' boiling of an alcoholic solution containing 11 g. of 2-amino-5-chloro-4'-dimethylamino-diphenylamine and 6.1 g. of salicylic aldehyde, to which 4 ml. of nitrobenzene or mercuric oxide are added as a dehydrogenating agent. The compound obtained is purified by recrystallization from a dioxane/water mixture.

1 - (4' - dimethylamino-phenyl)-2-(4'-dimethylamino-phenyl) - 6 - chloro-benzimidazole, corresponding to Formula 57, melting point 217° C., is obtained by a 10 hours' boiling of a solution of 7.8 g. of 2-amino-5-chloro-4'-dimethylamino-diphenylamine and 4.5 g. of 4-dimethyl-aminobenzaldehyde in an alcohol/dioxane mixture and subsequent 3 hours' boiling in nitrobenzene. The compound obtained is recrystallized from alcohol.

1 - benzyl-2-(4'-oxy-phenyl)-benzimidazole corresponding to Formula 58, melting point 233° C., is obtained by a 5 hours' boiling of an alcoholic solution containing 19.8 g. of N-benzyl-o-phenylenediamine and 13 g. of 4-hydroxybenzaldehyde, to which 5 ml. of nitrobenzene are added. The compound obtained is purified by recrystallization from dioxane. 2 - (p - dimethylamino-phenyl)-(naphth-2′,3′:4,5-imidazole), corresponding to Formula 59, sinters at a temperature of 300° C.

It is prepared as follows:

15.4 g. of 2,3-naphthalenediamine and 14.9 g. of p-dimethylaminobenzaldehyde are dissolved in 230 g. of ethylalcohol and heated for 3 minutes at a temperature of 60° C., 100 g. of nitrobenzene are added to the reaction mixture, the alcohol is evaporated and subsequently the mixture is heated for some minutes until the temperature is attained which corresponds to the boiling point of nitrobenzene. Subsequently the reaction mixture is cooled down, and the precipitate is separated, dried and recrystallized from benzene.

2 - pyridyl - (2) - naphthimidazole corresponding to Formula 60, melting point 224–225° C., is prepared as follows:

15.8 g. of 2,3-naphthalenediamine and 10.7 g. of 2-pyridinealdehyde are mixed with each other and, after adding 40 g. of nitrobenzene, heated to 170–180° C. After cooling, the solution is filtered and the filtrate is first diluted with 100 g. of ethyl alcohol and then mixed with 50 g. of concentrated hydrochloric acid and 1 liter of water. A brown precipitate is formed, which is separated, dissolved in hot water, and treated with ammonia. After repeated suction, the precipitate is recrystallized from ethyl alcohol.

1 - methyl - 2 - (2′-hydroxy-phenyl)-4,5-1′,2′-naphthoimidazole, corresponding to Formula 61, melting point 155° C., is prepared by 1 hour's boiling of an alcoholic solution containing 17.2 g. of 2-methylamino-1-naphthylamine and 14 g. of salicylic aldehyde, together with 2.5 g. of m-dinitrobenzene as a dehydrogenating agent, and recrystallization from alcohol.

1 - ethyl - 2 - (4′ - dimethylamino - phenyl) - 4,5 - 1′,2′-(7′-methoxy)-naphthoimidazole, corresponding to Formula 62, melting point 208° C., is prepared by boiling an alcoholic solution of 12.6 g. of 1-amino-2-ethylamino-7-methoxy-naphthalene and 7.5 g. of 4-dimethylamino-benzaldehyde, in the presence of 2.1 g. of m-dinitrobenzene. For purification, the reaction product is recrystallized from a mixture of benzene and a light petroleum fraction.

2-phenyl-phenanthreno-9′,10′:4,5-oxazole, corresponding to Formula 63, melting point 200–202° C.

2-(4′-chloro-phenyl)-phenanthreno-9′,10′:4,5 - oxazole, corresponding to Formula 64, melting point 256–257° C., is prepared by heating 20.8 g. of phenanthrenequinone, 14 g. of 4-chlorobenzaldehyde, and 500 g. of formamide for 6 hours at a temperature of 180–190° C. The reaction mixture is poured into water and the precipitate is separated and recrystallized from dioxane.

Analogously are prepared:

2 - (4′ - methoxy - phenyl) - phenanthreno - 9′,10′: 4,5-oxazole, corresponding to Formula 65, melting point, after recrystallization from 80 percent ethyl alcohol, 179–180° C., on using 20.8 g. of phenanthrenequinone, 13.6 g. of anisaldehyde, and 400 g. of formamide;

2 - (4′ - diethylamino - phenyl) - phenanthreno-9′,10′:4,5-oxazole, corresponding to Formula 66, melting point, after recrystallization from 96 percent alcohol, 260–265° C., on using 20.8 g. of phenanthrenequinone, 17.7 g. of p-diethylaminobenzaldehyde, and 500 g. of formamide;

2 - furyl - phenanthreno-9′,10′:4,5-oxazole, corresponding to Formula 67, melting point, after recrystallization from dioxane, 228–230° C., on using 20.8 g. of phenanthrenequinone, 10 g. of furfurol, and 500 g. of formamide.

1-methyl-2-pyrryl-(2)-5-methyl - benzmidazole, corresponding to Formula 68, melting point 193° C., is obtained by boiling and alcoholic solution of 6.8 g. of 2-amino-4-methyl-1-monomethylaniline and 4.75 g. of pyrrol-2-aldehyde with 2.1 g. of m-dinitrobenzene. After the alcohol has been distilled off, the benzimidazole forms a residue which is twice recrystallized from alcohol for purification.

1-methyl-2-pyrryl-(2)-5-methyl - benzimidazole, corresponding to Formula 69, melting point 114° C., is obtained by boiling an alcoholic solution of 6.8 g. of 2-amino-4-methyl-1-monomethylaniline and 7.8 g. of α-naphthaldehyde with 2.1 g. of m-dinitrobenzene. The product thus obtained is recrystallized from a light petroleum fraction.

The primuline base corresponding to Formula 70.

2-(4′-amino-phenyl)-benzimidazole, corresponding to Formula 71, melting point 240° C.

The compound corresponding to Formula 72 is obtained by heating 4.8 g. of 2-(4′-aminophenyl)-6-methyl-benzothiazole with 2.4 g. of phenyl-isocyanate in a benzolic solution. After recrystallization from acetone, the compound melts at 202° C.

The compound corresponding to Formula 73, the 2-(3′-amino-4′-dimethylamino-phenyl)-6-methyl-benzothiazole, is obtained by catalytic hydrogenation of the corresponding nitro compound in dioxane and melts at 109° C., after recrystallization from methanol. The 2-(3′-nitro-4-dimethylaminophenyl)-6-methyl - benzothiazole is obtained by nitration of 4 g. of 2-(4′-dimethylaminophenyl)-6-methyl-benzothiazole in 70 ml. of 10% sulfuric acid containing 3 g. of sodium nitrite. If recrystallized from alcohol, the nitro compound melts at 144° C.

The compound corresponding to Formula 74 is obtained by a brief heating o 2 g. of 2-(3′-amino-4′-dimethylaminophenyl)-6-methyl-benzothiazole in a benzolic solution with 1 g. of phenyl-isocyanates. After recrystallization from acetone, the compound melts at 224° C.

The compounds corresponding to Formulae 75, 76, 77 and 78 are prepared from 2-(4′-dimethylaminophenyl)-6-methyl-benzothiazole in accordance with the description given in U.S. Patent No. 2,733,242.

2 - (4′ - dimethylaminophenyl)- 6 - methyl - benzothiazole-sulfonamide, corresponding to Formula 75, is prepared from the sulfochloride obtainable by adding 5 g. of 2-(4′-dimethylaminophenyl)-6-methyl-benzothiazole to 38 g. of chlorosulfonic acid at a temperature ranging from 0 to 10° C. and then heating for one hour. The sulfochloride thus obtained is then introduced into 30 ml. of 27% ammonia solution at room temperature and the suspension which forms is agitated for 24 hours. After recrystallization from ethyleneglycol monomethylether, the sulfonamide corresponding to Formula 75 forms light yellow crystals which melt at 244° C.

Analogously, the 2-(4′-dimethylaminophenyl)-6-methyl-benzothiazole-N-monomethyl-sulfonamide corresponding to Formula 76 is obtained, replacing the ammonia solution by 50 ml. of a 25% alcoholic monomethylamine solution. After recrystallization from alcohol, the N-methylsulfonamide forms yellow crystals which melt at 204° C.

For the preparation of the compound corresponding to Formula 77, the sulfochloride is introduced into 50 ml. of a 25% alcoholic monoethylamine solution. After recrystallization from 75% alcohol, the N-ethyl-sulfonamide forms yellow crystals which melt at 172° C.

The 2-(4′-dimethylaminophenyl) - 6-methyl-benzothiazolesulfonic acid-morpholide, corresponding to Formula 78, is obtained from the above sulfochloride by introducing it into 25 ml. of morpholine and 25 ml. of alcohol. The sulfonic acid-morpholide thus obtained forms yellow crystals. If recrystallized from alcohol, it melts at 189° C.

For the production of photoconductive insulating layers, preferably solutions of the thiazole, oxazole or imidazole compounds according to the present invention are used; e.g. benzene, acetone, methylene chloride and glycolmonomethyl ether. Mixtures of photoconductive substances as well as of solvents may be used. Further, it is possible to use the photoconductive substances according to the present invention in admixture with other organic semiphotoconductive substances.

As has further been discovered it can be an advantage in the production of the photoconductive insulating layers to use organic colloids in association with the compounds corresponding to the above given general formula. The following may appropriately be mentioned:

The natural and synthetic resins, e.g. balsam resins, phenol resins modified with colophony and other resins of which colophony constitutes a major part, coumarone resins and idene resins, and the substances covered by the collective term "synthetic lacquer resins," which according to the Kunststofftaschenbuch (Plastics Pocket Book), published by Saechtling-Zebrowski (11th edition, Munich 1955, page 212 et seq.) include processed natural substances such as cellulose ether;

Polymers such as the polyvinyl chlorides, polyvinyl acetate, polyvinyl acetals, polyvinyl alcohols, polyvinyl ethers, polyacrylic and polymethacrylic esters, polystyrene and isobutylene;

Polycondensates, e.g. polyesters, such as phthalate resins, alkyd resins, maleinate resins, mixed esters of higher alcohols, and maleic resin and colophony, phenol-formaldehyde resins, particularly colophony-modified phenol-formaldehyde condensates, urea-formaldehyde resins, melamine-formaldehyde condensates, aldehyde resins, ketone resins of which particular mention is made of the AW 2 resins of the firm Badische Anilin- und Soda-fabrik, xylen-formaldehyde resins and polyamides; and polyadducts, such as polyurethane.

When using the photoconductive compounds in admixture with organic colloids, the proportions of resin to photoconductive substances can vary very greatly. The use of mixtures of approximately equal parts of resin and photoconductive substance has been found advantageous. When using mixtures of approximately equal parts of resin and thiazole body or oxazole body according to the present invention, in most cases their solutions yield, on drying, homogeneous, transparent, for the most part colorless layers, that can be considered as solid solutions.

The base materials used as electroconductive supports may be any that satisfy the requirements of xerography, e.g. metal or glass plates, paper plates or films made of electrically conductive resins, or plastic resins, the so-called plastic material. If the paper is used as support for the photoconductive layer, pretreatment of the paper against penetration of the coating solution is advisable, e.g. with methyl-cellulose in aqueous solution or polyvinyl alcohol in aqueous solution or with a solution in acetone and methylethylketone of a copolymer of acrylic acid methyl ester and acrylonitrile or with solutions of polyamides in aqueous alcohols. Aqueous dispersions of said substances suitable for the pretreatment of the paper surface may also be used.

The solutions of the thiazole bodies, oxazole bodies and imidazole bodies according to the present invention, with or without the resins, are applied to the supports in the usual manner, for example by spraying, brushing, whirl coating, etc., and then dried so as to produce a homogeneous photoconductive layer on the electroconductive support.

The layers are in themselves not light-sensitive. However, after a positive or a negative electrostatic charge has been applied to the layers, i.e. after they have been charged by means of, for example, a corona discharge, the layer is light-sensitive and can be used with long-wave U.V. light of 3600–4200 A. for electrophotographic image production. Even very short exposure under a master to a high pressure mercury lamp will give good images.

The layers corresponding to the invention have, even when charged, very little sensitivity to the visible range of the spectrum. However, the further discovery has been made that the spectral sensitivity of the photoconductive layer can be extended by means of sensitizers into the visible part of the spectrum. The amount of sensitizer to be added to the photoconductive substance is 1–3%. The most suitable sensitizers are dyestuffs; for their easier identification the number is given under which they are listed in Schultz' "Farbstofftabellen" (7th edition, 1st volume, Leipzig 1931). The following are given as examples of effective sensitizers:

Triarylmethane dyestuffs such as brilliant green (No. 760, p. 314) Victoria blue B (No. 822, p. 347) methyl violet (No. 783, p. 327), crystal violet (No. 785, p. 329), acid violet 6B (No. 831, p. 351), xanthene dyestuffs, namely rhodamines, such as rhodamines B (No. 864, p. 365), rhodamine 6G (No. 866, p. 366), rhodamine G extra (No. 865, p. 366), sulforhodamine B (No. 863, p. 364), and true acid eosin G (No. 870, p. 368), as also phthaleins such as eosin S (No. 883, p. 375), eosin A (No. 881, p. 374), erythrosin (No. 886, p. 376), pholxin (No. 890, p. 378), Rose Bengal (No. 889, p. 378), and fluorescein (No. 880, p. 373), thiazine dyestuffs such as methylene blue (No. 1038, p. 449); acridine dyestuffs such as acridine yellow (No. 901, p. 383), acridine orange (No. 908, p. 387) and trypaflavine (No. 906, p. 386); quinoline dyestuffs such as pinacyanol (No. 924, p. 396) and cryptocyanine (No. 927, p. 397); quinone dyestuffs and ketone dyestuffs such as alizarin (No. 1141, p. 499), alizarin red S (No. 1145, p. 502) and quinizarine (No. 1148, p. 504); cyanine dyestuffs, e.g. cyanine (No. 921, p. 394) and chlorophyll.

The production of the images by electrophotographic means is carried out as follows: When the photoconductive layer has been charged, by means of, for example, a corona discharge with a charging apparatus maintained at 6000–7000 volts, the support, e.g. paper or aluminum foil or plastic film with the sensitized layer is exposed to light under a master or by episcopic or diascopic projection, and is then dusted over in known manner with a resin powder colored with carbon black. The image that now becomes visible can easily be wiped off. It therefore has to be fixed; it can, for example, be heated briefly, by means of an infra-red radiator, to 120° C. or to whatever the baking temperatures of the developer used may be. The temperature required is less if the heat treatment is carried out in the presence of vapors of solvents such as trichloroethylene, carbon tetrachloride or ethyl alcohol. Steam-fixing of the powdered image is also possible. From positive masters, positive images characterized by good contrast are produced.

The electrophotographic images according to the present invention have the considerable advantage that they, after being fixed, can be converted into a printing plate when the support, e.g. the paper or plastic film is wiped over with a solvent for the photoconductive layer, e.g. alcohol, or acetic acid, whereby the image-free parts of the layer are removed, so that the support can now be wetter with water. Subsequently, the support is inked with greasy ink, which remains at the image areas only. In this way positive printing plates are obtained which can be set up in an offset machine and used for printing; they give very long runs.

If transparent supports are used, the electro-photographic images can also be used as masters for the production of further copies on any sort of light-sensitive sheets. In this respect, the photoconductive compounds to be used according to the present invention are superior to the substances used hitherto, such as selenium or zinc oxide, inasmuch as the latter give cloudy and non-copyable layers because solid solutions can not be produced with such materials, and only suspensions are possible.

If translucent supports are used for the photoconductive supports according to the present invention, reflex images can be produced also, which can be transferred by contacting any oppositely charged support, e.g.

paper. The possibility of a reflex copy is also an advantage over the known art.

Moreover the photoconductive layers according to the present invention have a further important advantage in that they can be charged positively as well as negatively. With positive charging, the images are particularly good while evolution of ozone, which is injurious to health and with negative charging very copious, is negligible.

*Example I*

10 g. of a product prepared by after-chlorination of polyvinylchloride, e.g. polyvinylchloride, e.g. of the product by Messrs. Dynamit Aktiengesellschaft vorm. Alfred Nobel & Co., Werk Rheinfelden, under the registered trademark "Renoflex" are dissolved in 100 g. of methylethylketone. To this solution, there are added first a solution of 10 g. of 2-(4'-aminophenyl)-6-methyl-benzothiazole, corresponding to Formula 8, in 50 g. of toluene and then a solution of 0.004 g. of ethyl violet (Schultz' Farbstofftabellen, 7th edition, volume I (1931), No. 737) in 2 g. of methanol. This solution which has a kinematic viscosity of about 20.8 cs. is used for coating a paper base in a coating machine. Preferably, the coated layer should have a thickness of about 6μ. After the coated layer has been dried, the paper is given a positive charge by means of a corona discharge. On the charged paper a latent image of a book page, printed on both sides, is produced by means of an episcopic process. Subsequently, the layer side of the paper is treated with a developer consisting of very fine glass balls melt-coated with a resin and of a very finely distributed resin-carbon black mixture. The black colored resin adheres to those parts of the layer which during exposure were not struck by light. A positive image becomes visible which is fixed by slight heating. The image shows good contrast.

*Example II*

1 g. of 2-(4'-acetaminophenyl)-6-methyl-benzothiazole corresponding to Formula 9, 1 g. of Zinkresinat 357 (a zinc resinate solid by Messrs. Lehmann & Crebert, Mannheim-Rheinau) and 0.02 g. of acid violet 6 BN (Schultz' Farbstofftabellen, 7th edition, volume I (1931) No. 831) are dissolved in 30 g. of ethyleneglycol monomethylether and the solution thus obtained is coated onto paper and dried. By means of a corona discharge, the paper is charged and the thus sensitized paper is exposed for ¼ sec. under a positive original, using a 100-watt incandescent lamp at a distance of about 15 cm. As described in Example I, the latent image is dusted with a resin powder colored by carbon black. A positive image is obtained which is fixed by heating.

*Example III*

The process described in Example I is repeated, but for coating the paper a solution is used consisting of 30 g. of ethyleneglycol monomethylether, 1 g. of a primuline base, corresponding to Formula 70, and 1.5 g. of a polymerized natural resin, e.g. of the resin produced by the U.S. firm Hercules Powder Company, Wilmington, and sold under the registered trademark "Hercules Poly Pale." Positive images are obtained. Instead of the resin just mentioned there may be used a resin consisting essentially of dimerized abietic acid, e.g. the resin also sold by Hercules Powder Company under the registered trademark "Hercules Dymerex," or a hydrated natural resin, e.g. a resin sold by Messrs. Hercules Powder Company under the registered trademark "Hercules Staybelite."

*Example IV*

1 g. of 2-(4'dimethylamino-phenyl)-6-methylbenzothiazole, corresponding to Formula 10, 1 g. of a rosin formaldehyde resin, e.g. of the resin sold by Messrs. Farbenfabriken Bayer Aktiengesellschaft, Leverkusen, under the registered trademark "Corepal" 140, and 0.01 g. of methylene blue (Schultz' Farbstofftabellen, 7th edition, volume I (1931) No. 1038) are dissolved in 30 g. of benzene, and the solution is coated onto a paper base the surface of which had been pretreated to prevent the penetration of organic solvents. After drying, the coated paper is given an electric charge, e.g. by means of a corona discharge. By exposure under a high-pressure mercury lamp or an incandescent lamp the paper may be discharged which, when an original is interposed causes the production of an image. By the addition of methylene blue, the time of exposure has been shortened to ⅕ of the time required when no sensitizing agent is present.

*Example V*

1 g. of 2-(4'-aminophenyl)-benzimidazole, corresponding to Formula 71, and 1 g. of a maleinate resin, e.g. of the product sold by the firm Chemische Werke Albert, Wiesbaden-Biebrich, under the registered trademark "Alresat" 400 C are dissolved in 30 g. of benzene and the solution is coated onto an aluminum foil. After evaporation of the solvent, a layer remains which adheres firmly to the surface of the aluminum foil. The thus coated foil may be used for producing in a manner known per se images by an electrophotographic process. From these images, copies with good contrast can be made on paper by a usual transfer process.

*Example VI*

1 g. of 2-(4'-diethylaminophenyl)phenanthreno-9',10': 4,5-oxazole, corresponding to Formula 66, and 1 g. of a ketone resin, e.g. of the product manufactured by Messrs. Chemische Werke Huls Aktiengesellschaft, Marl, and sold under the registered trademark "Kunstharz SK," are dissolved in 30 g. of ethyleneglycol monomethylether. The solution is coated onto transparent paper the surface of which had been pretreated to prevent penetration of organic solvents, and dried. By means of an electrophotographic process images of good contrast are produced on the transparent paper thus coated. By heating or by treatment with vapors of trichloroethylene, these images are fixed. They may be used as intermediate originals for making further copies, e.g. on diazotype paper.

*Example VII*

0.5 g. of 2-(4'-chlorophenyl) phenanthreno-9',10':4, 5-oxazole, corresponding to Formula 64, 1.5 g. of 2-(4'-methoxyphenyl)phenanthreno-9',10':4,5-oxazole, corresponding to Formula 65, and 1 g. of Kunstharz AW 2, a product sold by Messrs. Badische Anilin & Soda-Fabrik AG, Ludwigshafen/Rh., are dissolved in 50 g. of benzene. The solution is coated onto a base paper produced in accordance with U.S. Patents Nos. 2,534,650, 2,681,617 or 2,559,610. After evaporation of the solvent, a firmly adhering layer has formed on the paper surface. By an electrophotographic process direct images with good contrast are produced on the paper thus coated. After fixation by the influence of heat these images can be transformed into printing plates by wiping the layer side of the paper with 96% alcohol, rinsing with water, and inking with greasy ink in the presence of a 1% phosphoric acid. Positive printing plates are obtained which may be clamped in an offset printing apparatus and used for printing.

*Example VIII*

10 g. of an after-chlorinated polyvinyl-chloride having a chlor content of about 60 percent are dissolved in 100 g. of methyl ethyl ketone. To this solution there are added first a solution of 10 g. of 2-(4'-dimethylaminophenyl)-naphtho-2',3':4,5-imidazole, corresponding to Formula 59, in 50 g. of toluene and then a solution of 0.01 g. of Rhodamine B extra (Schultz' Farbstofftabellen, 7th edition, volume I (1931), No. 864) in 2 g. of methanol. The solution thus obtained which has a kinematic viscosity of about 20.8 cs., is used for coating, in a coating machine, an opaque base paper which is permeable for light rays and the surface of which has been pretreated to prevent penetration of organic solvents. The layer has a thickness of about 6μ. By means of a corona discharge, the coated paper is given a negative electric charge and then placed with its layer side onto a book page printed on both sides which had been backed by black paper. The book page serving as an original is then exposed for 1 second through the opaque electrophotographic paper to the light of a 100-watt incandescent bulb. The reflex image thus produced is developed by a developer powder consisting of 100 g. of glass balls and 2.5 g. of a toner having a grain size of 20 to 50μ. The toner has been prepared by melting, grinding and sieving the following substances:

30 g. of Polystyrol LG, a product of the Badische Anilin- und Soda-Fabrik AG, Ludwigshafen/Rhein 30 g. of "Beckacite" K 105, a product of the firm Reichhold-Chemie AG, Hamburg. "Beckacite" is a registered trademark 3 g. of Peerless Black Russ 552, a product of the firm Druckfarbenfabriken Gebr. Hartmann, Concentra Gmbh, Frankfurt/M.

A positive, reverse image of the original is obtained. If paper plastic film or a fabric is firmly pressed on the powder image thus obtained, the images transfer onto these materials so they they carry a non-reverse image of the original used. In the preparation of this non-reverse image an electrical field may be applied in known manner to the paper or the film which are to carry the non-reverse image. If a transparent paper or film are used, intermediate originals are obtained that can be used for making further copies, e.g. by a diazotype process.

*Example IX*

1 g. of 2-(4'-dimethylaminophenyl)-benzoxazole, corresponding to Formula 32, and 1 g. of unsaponified ketone-aldehyde-condensation resin, e.g. of the product manufactured by the firm Chemische Werke Huls, AG, Marl, and sold under the name "Kunstharz AP" are dissolved in 30 ml. of benzene. To this solution there is added 0.01 g. of Rhodamine B (Schultz' Farbstofftabellen, 7th edition, volume I (1931), No. 864) and the solution is coated onto a paper base provided with a precoat which prevents the penetration of organic solvents. After evaporation of the solvents, the layer thus formed adheres firmly to the surface of the paper. In a manner known per se the coated paper is provided with a positive electrostatic charge and then exposed under a positive original, using, e.g. a 300-watt incandescent bulb at a distance of 30 cm. for 2 seconds. The exposed paper surface, which now carries a latent electrostatic image of the original, is dusted with a resin powder colored with carbon black. A positive image is obtained which is fixed by the influence of heat, e.g. by a treatment with steam.

*Example X*

1 g. of 2-(4'-diethylaminophenyl)-6-dimethyl-aminobenzothiazole, corresponding to Formula 28, and 1 g. of a coumarone resin, e.g. of the "Comaronharz 701/70" sold by Messrs. Gesellschaft für Teerverwertung mbH in Duisburg/Meiderich, are dissolved in 30 ml. of benzene. The solution is coated onto an aluminum foil the surface of which had been made grease-free. By means of an electrophotographic process images with good contrast are produced on the coated foil. These images are fixed and then converted into a printing plate by wiping over the aluminum foil with a 96 percent alcohol, rinsing with water and inking with greasy ink in the presence of 1 percent phosphoric acid. A positive printing plate is obtained which may be used for printing in an offset printing machine.

*Example XI*

1 g. of 2-(4'-diethylaminophenyl)-6-methylbenzothiazole, corresponding to Formula 11, and 1 g. of a ketone resin, e.g. of the "Kunstharz EM" prepared by the firm Rheinpreussen GmbH, Homberg/Ndrh., through polycondensation, are dissolved in 30 ml. of benzene. In 2 separate steps, 15 ml. each of this solution are coated onto a sheet of transparent paper known as DIN A 4 (210x297 mm.), to form a layer thereon. After evaporation of the solvent, the coated layer is dried under an infra-red radiator. Thereafter the layer adheres firmly to the surface of the paper. By means of an electrophotographic process, images with good contrast are produced on this layer. These images are suitable as originals in diazotype process.

*Example XII*

1 g. of 2-(4'-dimethylaminophenyl)-6-methoxybenzothiazole, corresponding to Formula 20, 1 g. of a ketone resin, e.g. of the product sold by Messrs. Chemische Werke Huls, AG, Marl, under the name Kunstharz SK, and 0.01 g. of acid violet 6BN (Schultz' Farbstofftabellen, 7th edition, volume I (1931), No. 831) are dissolved in 30 ml. of ethyleneglycol monomethylether. The light blue solution is coated onto a paper base the surface of which had been precoated with an after-chlorinated polyvinyl chloride to prevent penetration of organic solvents. After the coated paper is given an electric charge by means of a corona discharge, it is exposed under a transparent positive original, using a 300-watt incandescent bulb, and then dusted with a resin powder colored with carbon black. A positive image is obtained which is fixed by heating with an infrared radiator. The image shows with good contrast against a light blue background.

*Example XIII*

1 g. of 1-methyl-2-(4'-dimethylaminophenyl)-6-methylbenzimidazole, corresponding to Formula 46, and 1 g. of 1 - methyl - 2 - (4' - diethylaminophenyl) - 5 - methylbenzamidazole, corresponding to Formula 49, are dissolved in 30 ml. of benzene. About 15 ml. of this solution are coated onto a DIN A 4 paper base the surface of which had been pretreated by prevent penetration of organic solvents. After drying, images are produced on the thus coated paper by means of an electrophotographic process. The images are fixed by treatment with a vaporous organic solvent, e.g. with trichloroethylene vapors.

*Example XIV*

1 g. of 1-ethyl-2-(4''-dimethylaminophenyl)-4,5-1',2'-(7'-methoxy)-naphthimidazole, corresponding to Formula 62, and 1 g. of a resin-modified maleic acid resin, e.g. the product sold by Messrs. Reichhold-Chemie AG, Hamburg, under the registered trademark "Beckacite" K 125, are dissolved in 30 ml. of benzene. About 15 ml. of this solution are used for coating a DIN A 4 sheet paper base the surface of which had been pretreated to prevent penetration of organic solvents, and the coat is then dried. In accordance with the method described in Example I, an electrophotographic image is produced on the thus coated paper sheet. By placing a sheet of paper onto the non-fixed carbon black-resin-powder image and once more charging with a corona discharge, the image is transferred from the electrophotographic layer onto the paper sheet, which now carries a reverse image. When the carbon black-resin-image is transferred onto transparent paper or a transparent plastic sheet, the transferred image may be used for making further copies, e.g. in a diazotype process.

*Example XV*

Paper which has been pre-treated to prevent the penetration of organic solvents is coated with a solution containing 1 g. of 2-(4'-dimethylaminophenyl)-6-methyl-benzothiazole-N-methyl-sulfonamide, corresponding to Formula 76, and 1 g. of chlorinated polyvinyl chloride in 30 ml. of toluene. After drying, the layer side of the paper is given a negative electric charge by means of a corona discharge. By exposing the coated paper for 1.5 seconds to the light of a high-pressure mercury lamp of 125 watts through an original, an electrostatic charge image is obtained which is then made visible by dusting over with a colored resin powder and fixed by a short heat treatment. An image corresponding to the original used is obtained which has a good contrast effect and shows no scumming.

It will be obvious to those skilled in the art that many modifications may be made within the scope of the present invention without departing from the spirit thereof, and the invention includes all such modifications.

What is claimed is:

1. An electrophotographic material comprising a conductive support layer and a photoconductive insulating layer, the latter containing at least one compound selected from the group consisting of a dyestuff sensitizer and an organic colloid in admixture with a compound having the formula

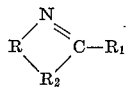

in which R is an ortho-arylene group, $R_1$ is selected from the group consisting of aryl and heterocyclic groups, and $R_2$ is selected from the group consisting of oxygen, sulfur, and imino, groups.

2. An electrophotographic material comprising a conductive support layer and a photoconductive insulating layer, the latter containing at least one compound selected from the group consisting of a dyestuff sensitizer and an organic colloid in admixture with a compound having the formula

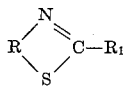

in which R is an ortho-arylene group and $R_1$ is an aryl group.

3. An electrophotographic material comprising a conductive support layer and a photoconductive insulating layer, the latter containing at least one compound selected from the group consisting of a dyestuff sensitizer and an organic colloid in admixture with a compound having the formula

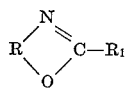

in which R is an ortho-arylene group and $R_1$ is an aryl group.

4. An electrophotographic material comprising a conductive support layer and a photoconductive insulating layer, the latter containing at least one compound selected from the group consisting of a dyestuff sensitizer and an organic colloid in admixture with a compound having the formula

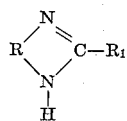

in which R is an ortho-arylene group and $R_1$ is an aryl group.

5. An electrophotographic material comprising a conductive support layer and a photoconductive insulating layer, the latter containing at least one compound selected from the group consisting of a dyestuff sensitizer and an organic colloid in admixture with a compound having the formula

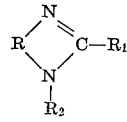

in which R is an ortho-arylene group, $R_1$ is a heterocyclic group and $R_2$ is a lower alkyl group.

6. An electrophotographic material comprising a conductive support layer and a phototconductive insulating layer, the latter containing at least one compound selected from the group consisting of a dyestuff sensitizer and an organic colloid in admixture with a compound having the formula

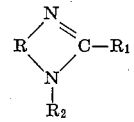

in which R is an ortho-arylene group and $R_1$ is an aryl group, and $R_2$ is a lower alkyl group.

7. An electrophotographic material comprising a conductive support layer and a photoconductive insulating layer, the latter containing at least one compound selected from the group consisting of a dyestuff sensitizer and an organic colloid in admixture with a compound having the formula

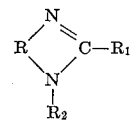

in which R is an ortho-arylene group and $R_1$ and $R_2$ are aryl groups.

8. A photographic reproduction process which comprises exposing a supported electrostatically charged photoconductive insulating layer to light under a master and developing the resulting image with an electroscopic material, the photoconductive layer comprising a compound having the formula

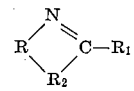

in which R is an ortho-arylene group, $R_1$ is selected from the group consisting of aryl and heterocyclic groups, and $R_2$ is selected from the group consisting of oxygen, sulfur, and imino groups.

9. A process according to claim 8 in which the photoconductive layer contains a dyestuff sensitizer.

10. A process according to claim 8 in which the photoconductive layer contains an organic colloid.

11. A photographic reproduction process which comprises exposing a supported electrostatically charged photoconductive insulating layer to light under a master and developing the resulting image with an electroscopic material, the photoconductive layer comprising a compound having the formula

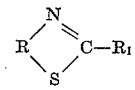

in which R is an ortho-arylene group and $R_1$ is an aryl group.

12. A photographic reproduction process which comprises exposing a supported electrostatically charged photoconductive insulating layer to light under a master and developing the resulting image with an electroscopic material, the photoconductive layer comprising a compound having the formula

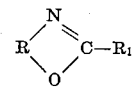

in which R is an ortho-arylene group and $R_1$ is an aryl group.

13. A photographic reproduction process which comprises exposing a supported electrostatically charged photoconductive insulating layer to light under a master and developing the resulting image with an electroscopic material, the photoconductive layer comprising a compound having the formula

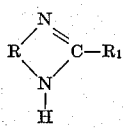

in which R is an ortho-arylene group and R₁ is an aryl group.

14. A photographic reproduction process which comprises exposing a supported electrostatically charged photoconductive insulating layer to light under a master and developing the resulting image with an electroscopic material, the photoconductive layer comprising a compound having the formula

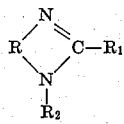

in which R is an ortho-arylene group, R₁ is a heterocyclic group and R₂ is a lower alkyl group.

15. A photographic reproduction process which comprises exposing a supported electrostatically charged photoconductive insulating layer to light under a master and developing the resulting image with an electroscopic material, the photoconductive layer comprising a compound having the formula

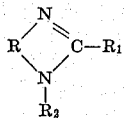

in which R and R₁ are ortho-arylene groups, and R₂ is a lower alkyl group.

16. A photographic reproduction process which comprises exposing a supported electrostatically charged photoconductive insulating layer to light under a master and developing the resulting image with an electroscopic material, the photoconductive layer comprising a compound having the formula

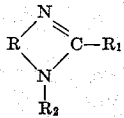

in which R is an ortho-arylene group and R₁ and R₂ are aryl groups.

17. An electrophotographic material comprising a conductive support layer and a photoconductive insulating layer, the latter containing at least one compound selected from the group consisting of a dyestuff sensitizer and an organic colloid in admixture with a compound having the formula

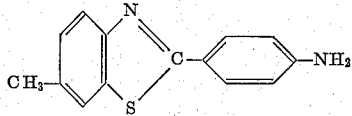

18. An electrophotographic material comprising a conductive support layer and a phototconductive insulating layer, the latter containing a compound having the formula

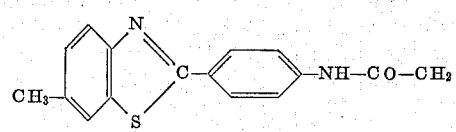

19. An electrophotographic material comprising a conductive support layer and a photoconductive insulating layer, the latter containing at least one compound selected from the group consisting of a dyestuff sensitizer and an organic colloid in admixture with a compound having the formula

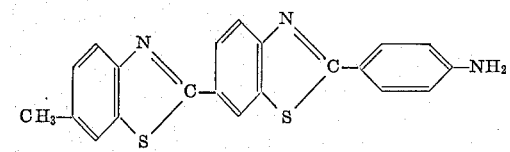

20. An electrophotographic material comprising a conductive support layer and a photoconductive insulating layer, the latter containing at least one compound selected from the group consisting of a dyestuff sensitizer and an organic colloid in admixture with a compound having the formula

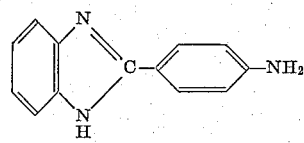

21. An electrophotographic material comprising a conductive support layer and a photoconductive insulating layer, the latter containing at least one compound selected from the group consisting of a dyestuff sensitizer and an organic colloid in admixture with a compound having the formula

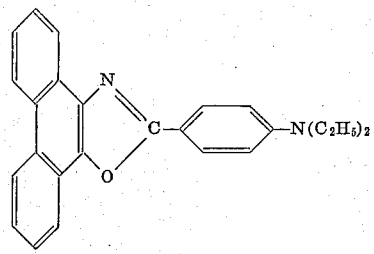

22. An electrophotographic material comprising a conductive support layer and a photoconductive insulating layer, the latter containing at least one compound selected from the group consisting of a dyestuff sensitizer and an organic colloid in admixture with a compound having the formula

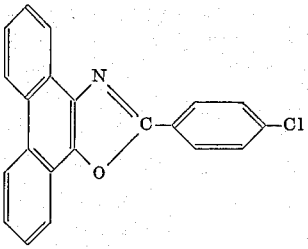

23. An electrophotographic material comprising a conductive support layer and a photoconductive insulating layer, the latter containing at least one compound selected from the group consisting of a dyestuff sensitizer and an organic colloid in admixture with a compound having the formula

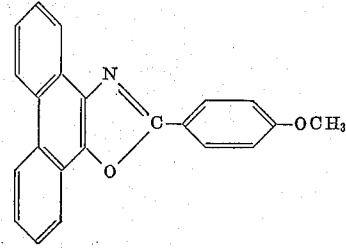

24. An electrophotographic materail comprising a conductive support layer and a photoconductive insulating layer, the latter containing at least one compound selected from the group consisting of a dyestuff sensitizer and an organic colloid in admixture with a compound having the formula

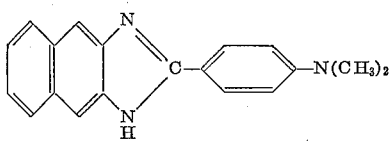

25. An electrophotographic material comprising a conductive support layer and a photoconductive insulating layer, the latter containing at least one compound selected from the group consisting of a dyestuff sensitizer and an organic colloid in admixture with a compound having the formula

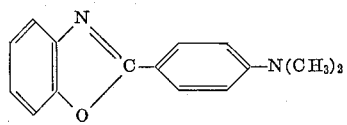

26. An electrophotograhic material comprising a conductive support layer and a photoconductive insulating layer, the latter containing at least one compound selected from the group consisting of a dyestuff sensitizer and an organic colloid in admixture with a compound having the formula

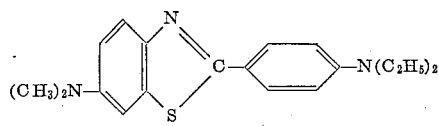

27. An electrophotographic material comprising a conductive support layer and a photoconductive insulating layer, the latter containing at least one compound selected from the group consisting of a dyestuff sensitizer and an organic colloid in admixture with a compound having the formula

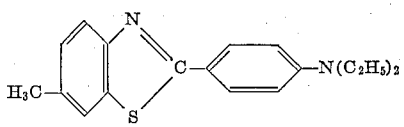

28. An electrophotographic material comprising a conductive support layer and a photoconductive insulating layer, the latter containing at least one compound selected from the group consisting of a dyestuff sensitizer and an organic colloid in admixture with a compound having the formula

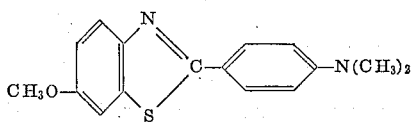

29. An electrophotographic material comprising a conductive support layer and a photoconductive insulating layer, the latter containing at least one compound selected from the group consisting of a dyestuff sensitizer and an organic colloid in admixture with a compound having the formula

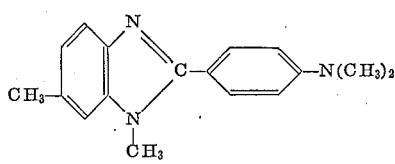

30. An electrophotographic material comprising a conductive support layer and a photoconductive insulating layer, the latter containing at least one compound selected from the group consisting of a dyestuff sensitizer and an organic colloid in admixture with a compound having the formula

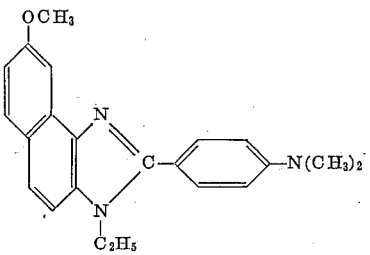

31. An electrophotographic material comprising a conductive support layer and a photoconductive insulating layer, the latter containing at least one compound selected from the group consisting of a dyestuff sensitizer and an organic colloid in admixture with a compound having the formula

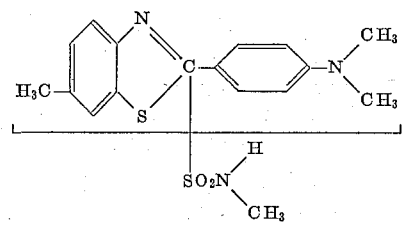

32. A photographic reproduction process which comprises exposing a supported electrostatically charged photoconductive insulating layer to light under a master and developing the resulting image with an electroscopic material, the photoconductive layer comprising a compound having the formula

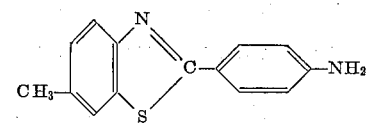

33. A photographic reproduction process which comprises exposing a supported electrostatically charged photoconductive insulating layer to light under a master and developing the resulting image with an electroscopic material, the photoconductive layer comprising a compound having the formula

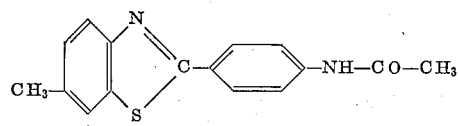

34. A photographic reproduction process which comprises exposing a supported electrostatically charged photoconductive insulating layer to light under a master and developing the resulting image with an electroscopic material, the photoconductive layer comprising a compound having the formula

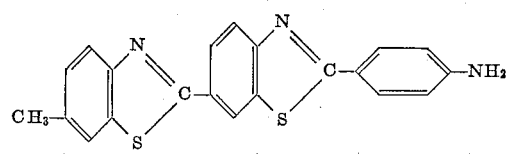

35. A photographic reproduction process which comprises exposing a supported electrostatically charged photoconductive insulating layer to light under a master and developing the resulting image with an electroscopic material, the photoconductive layer comprising a compound having the formula

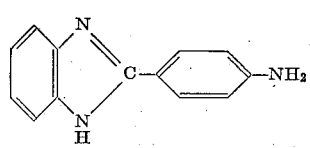

36. A photographic reproduction process which comprises exposing a supported electrostatically charged photoconductive insulating layer to light under a master and developing the resulting image with an electroscopic material, the photoconductive layer comprising a compound having the formula

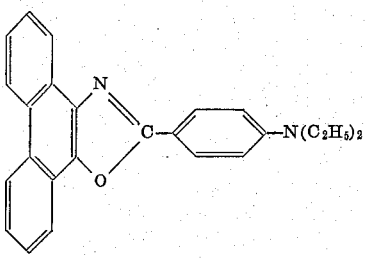

37. A photographic reproduction process which comprises exposing a supported electrostatically charged photoconductive insulating layer to light under a master and developing the resulting image with an electroscopic material, the photoconductive layer comprising a compound having the formula

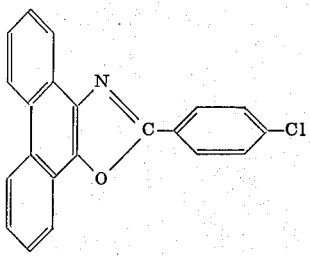

38. A photographic reproduction process which comprises exposing a supported electrostatically charged photoconductive insulating layer to light under a master and developing the resulting image with an electroscopic material, the photoconductive layer comprising a compound having the formula

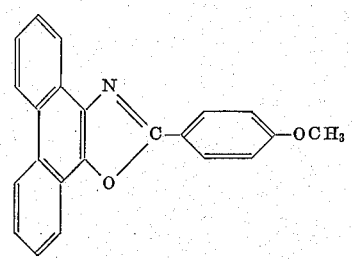

39. A photographic reproduction process which comprises exposing a supported electrostatically charged photoconductive insulating layer to light under a master and developing the resulting image with an electroscopic material, the photoconductive layer comprising a compound having the formula

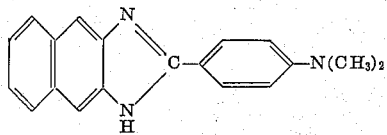

40. A photographic reproduction process which comprises exposing a supported electrostatically charged photoconductive insulating layer to light under a master and developing the resulting image with an electroscopic material, the photoconductive layer comprising a compound having the formula

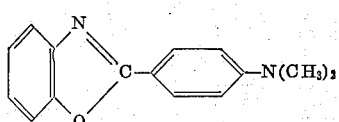

41. A photographic reproduction process which comprises exposing a supported electrostatically charged photoconductive insulating layer to light under a master and developing the resulting image with an electroscopic material, the photoconductive layer comprising a compound having the formula

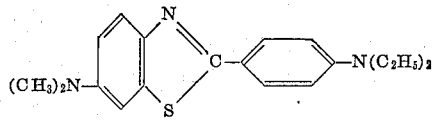

42. A photographic reproduction process which comprises exposing a supported electrostatically charged photoconductive insulating layer to light under a master and developing the resulting image with an electroscopic material, the photoconductive layer comprising a compound having the formula

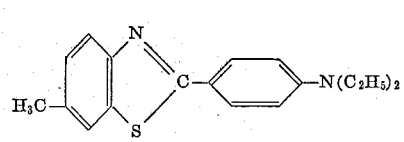

43. A photographic reproduction process which comprises exposing a supported electrostatically charged photoconductive insulating layer to light under a master and developing the resulting image with an electroscopic material, the photoconductive layer comprising a compound having the formula

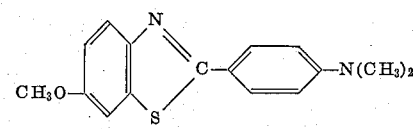

44. A photographic reproduction process which comprises exposing a supported electrostatically charged photoconductive insulating layer to light under a master and developing the resulting image with an electroscopic material, the photoconductive layer comprising a compound having the formula

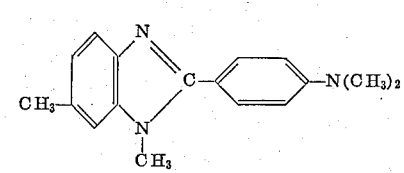

45. A photographic reproduction process which comprises exposing a supported electrostatically charged photoconductive insulating layer to light under a master and developing the resulting image with an electroscopic material, the photoconductive layer comprising a compound having the formula

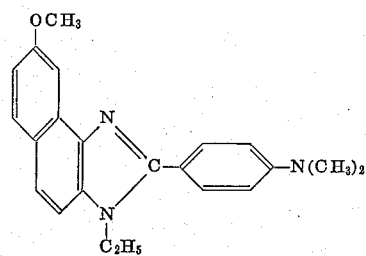

46. A photographic reproduction process which comprises exposing a supported electrostatically charged photoconductive insulating layer to light under a master and developing the resulting image with an electroscopic material, the photoconductive layer comprising a compound having the formula

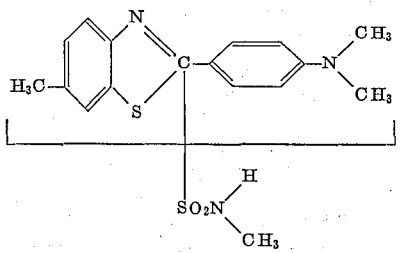

References Cited by the Examiner

UNITED STATES PATENTS

| | | | |
|---|---|---|---|
| 2,069,807 | 2/1937 | Heckert | 260—298 |
| 2,341,009 | 2/1941 | Axelrad. | |
| 2,368,222 | 1/1945 | Kendall et al. | 260—298 |
| 2,620,282 | 12/1952 | Fry et al. | |
| 2,639,990 | 5/1953 | Kendall et al. | 96—82 |
| 2,663,636 | 12/1953 | Middleton. | |
| 2,691,653 | 10/1954 | Williams et al. | 252—301.2 |
| 2,692,178 | 10/1954 | Grandadam. | |
| 2,704,286 | 3/1955 | Baum | 96—82 X |
| 2,709,702 | 5/1955 | William et al. | 260—309.6 |
| 2,793,192 | 5/1957 | Leavitt | 252—301.2 |

OTHER REFERENCES

Winslow et al.: Journ. Amer. Che. Soc., vol. 77, pp. 4751–4756, Sept. 20, 1955.

Lyons et al.: Journal of the Chemical Society, London, August 1957, pp. 3648–3660.

Metcalfe et al.: Journal of the Oil and Colour Chemists Association, vol. 39, No. 11, pp. 845–847 (November 1956).

Nelson: Journal of the Optical Society of America, vol. 46, No. 1, pp. 10–13 (January 1956).

Siegrist: "Das Papier," Jahrgang (8th year), Heft, vol. 7/8 of April 1954, pp. 109–120.

NORMAN G. TORCHIN, *Primary Examiner.*

MILTON STERMAN, PHILIP E. MANGAN, HAROLD N. BURSTEIN, ABRAHAM WINKELSTEIN,
*Examiners.*

J. E. ALIX, *Assistant Examiner.*